Patented June 12, 1934

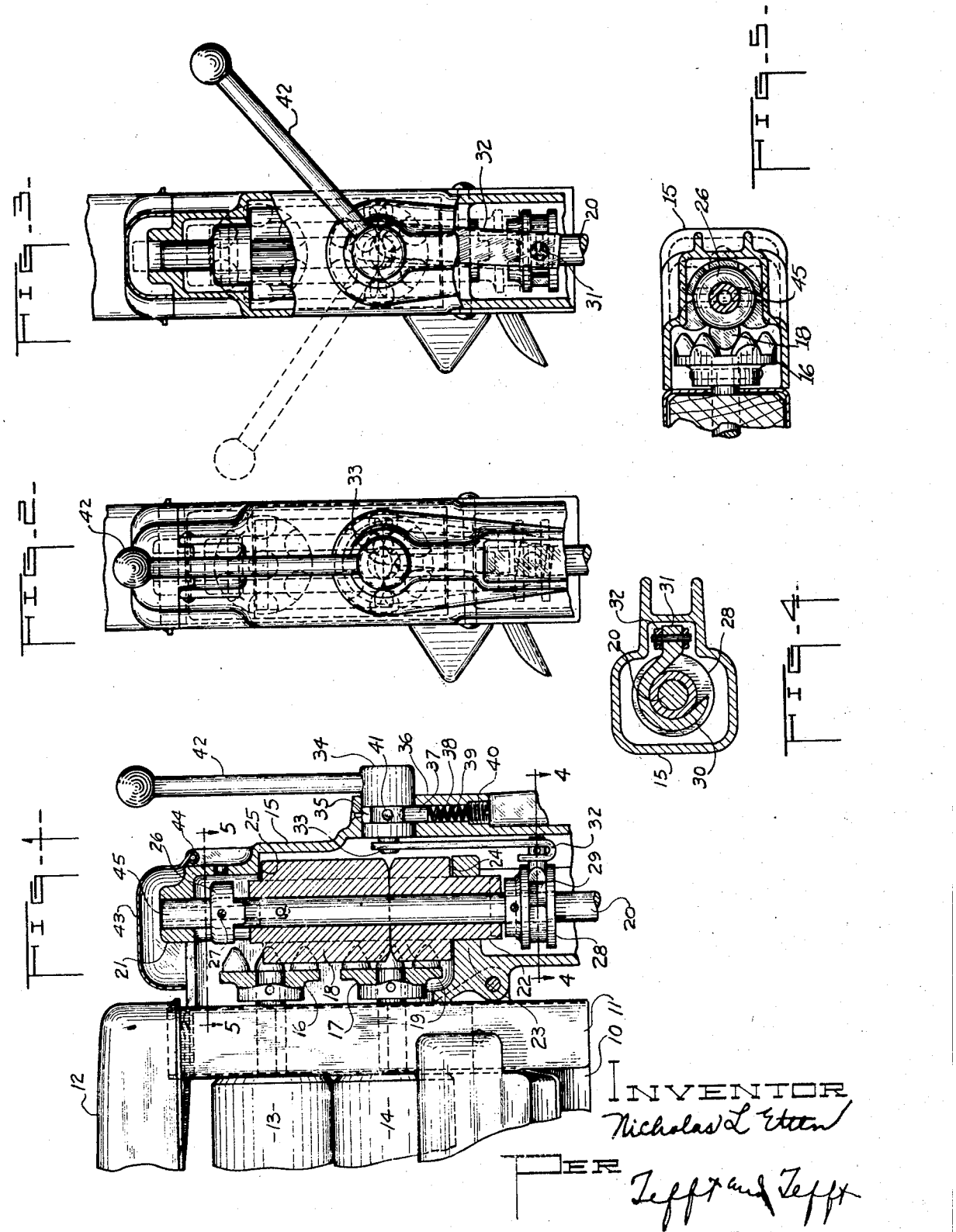

1,962,862

UNITED STATES PATENT OFFICE 1,962,862

WRINGER DRIVE MECHANISM

Nicholas L. Etten, Waterloo, Iowa

Application July 19, 1933, Serial No. 681,073

4 Claims. (Cl. 74—59)

This invention relates to mechanism for operating power driven roll wringers and more particularly to gear driving and reversing mechanism for controlling rotation of the wringer rolls.

An object of the invention is to provide a roll driving means whereby the rolls may be driven in either direction or remain in non-driven relation without removal of the gear driving means from meshed relation.

Another object is to provide a roll driving mechanism having a minimum of parts and simple means of control.

Still another object is to provide dual, vertically disposed driving gears of novel form, adapted to mesh with complementary driven gears secured to the shafts of wringer rolls, the driving and driven gears adapted to remain in mesh at all times, the driving gears adapted to be selectively rotated by the power means to rotate the rolls in predetermined direction.

A further object lies in the provision of simple manual control means whereby the driving gears are selectively engaged with the power means to rotate the wringer rolls in predetermined direction.

Other objects will appear in the following description and drawing, in which—

Fig. 1 is a fragmentary side elevational view of the wringer driving mechanism with certain parts shown in section to permit clearer view of underlying parts;

Fig. 2 is an end elevational view of the same showing certain parts to be described;

Fig. 3 is a view similar to that shown in Fig. 2 with certain parts shown in operated position and other parts broken away to facilitate description;

Fig. 4 is a slightly enlarged sectional view taken from line 4—4 in Fig. 1; and

Fig. 5 is a fragmentary, sectional view taken from line 5—5 in Fig. 1.

Referring to the drawing, Fig. 1 discloses the driving end of a roll wringer mechanism generally comprising a wringer frame 10 having upright end portions 11, only one of which is shown, and a transverse upper portion 12. The wringer frame may be supported by any conventional means which will not be described.

Wringer rolls 13 and 14 are supported in suitable bearings disposed in uprights 11.

Secured to upright 11 is a housing member 15 in the body of which is formed suitable brackets, bearings, etc. for supporting the roll driving mechanism which will now be described.

To the end of each wringer roll shaft is secured a gear, designated 16 and 17 respectively. These gears have specially formed teeth, which are so fashioned as to complementally mesh with specially formed teeth of vertically disposed gears 18 and 19, all as best shown in Fig. 1.

The upper gear 18 is rotatably supported upon an upright driving shaft 20, the shaft being rotatably and slidably supported at its upper end in a bearing 21 and at a lower point within the lower gear 19, the latter having a depending boss portion 22, which is journalled in a bearing 23 formed in housing 15.

Gears 18 and 19 are retained against longitudinal movement by means of gear 19 resting upon the upper surface of bearing 23, as at 24, and the supper end of gear 18 abutting a projecting surface of housing 15, as at 25.

A clutch collar 26 is secured to shaft 20 above gear 18 by means of a pin 27 as shown, the teeth of which are adapted to engage in indents formed in the upper end of gear 18.

Below gear 19 is similarly secured a clutch collar 28 having an annular groove 29 formed about its periphery. Tooth portions upon the upper side of collar 28 are adapted to engage in indents formed in the lower end of boss 22 of gear 19. Within groove 29 is slidably fitted a hook member 30, best shown in Fig. 4, having a shank portion 31 to which is rotatably secured a link member 32.

The upper end of link 32 is rotatably supported upon a pin 33 which is eccentrically secured to the inner end of a stub shaft 34.

Stub shaft 34, which is journalled in a bearing 36 formed in the body of housing 15, has an annular groove 35 about its central portion, and is retained in bearing 36 by means of a pin 37 slidably mounted in a circular opening 38 of housing 15.

Pin 37 is urged into groove 35 by a compression spring 39 abutted by a screw plug 40.

The inner end of pin 37 is rounded in such a manner as to engage indents 41 formed in the bottom of groove 35, the indents being so disposed that pin 37 is operable to retain stub shaft 34 in predetermined rotated positions, as will be referred to later.

A handle 42 secured to stub shaft 34 provides manual means for rotating stub shaft 34.

Fig. 1 will indicate that a cover member 43 is hinged at 44 upon housing 15, and that an oil hole 45 is provided in shaft 20 by means of which lubricant is conducted to the interior bearing surfaces of gears 18 and 19. Obviously, the cover 43 provides an effective cover for the upper end of shaft 20 and at the same time means of access for the purpose of applying lubrication to the parts.

Having described the structure of my invention, operation thereof may now be described as follows:

Hook 30 has already been described as retained in groove 29. It will be apparent that the weight of shaft 20 and attached parts, is supported by the hook 30 which is itself supported from stub shaft 34 through link 32.

It may be assumed that shaft 20 is rotated through suitable connection with power means not here shown.

With shaft 20 rotating and all parts in position shown in Fig. 1, shaft 20 will freely rotate within gears 19 and 20, while collars 26 and 28 will rotate in unison with the shaft. Due to the eccentric location of pin 33 upon stub shaft 34, rotation of shaft 34, for example in a counter-clockwise direction (Fig. 2), will result in upward vertical movement of shaft 20, together with collar 28 to engage the teeth thereof with gear 19, whereby gear 19 is rotated in unison with shaft 20 and gear 17, together with wringer roll 14, is rotated in corresponding direction.

Bearing in mind that gear 18 is free to rotate upon shaft 20, it will be clear that power transmitted from gear 19 to gear 17 may be transmitted from gear 17 to gear 18 and therethrough to gear 16. Thus, both wringer rolls are positively driven.

The parts are retained in position by means of pin 37 engaged in one of indents 41.

Obviously, rotation of stub shaft 34 to its original position will replace the parts in non-operative position, as shown in Fig. 1, in which position they may be retained by another of indents 41 as described.

Continued rotation of stub shaft 34 in clockwise direction will result in descending vertical movement of shaft 20 to engage collar 26 with gear 18. It will be noted that gear 18 meshes with the inner portions of both of gears 16 and 17. Thus, when gear 18 is in engagement with shaft 20, both rolls 14 and 16 are directly driven by gear 18, with gear 19 idling upon shaft 20.

Referring to Figs. 2 and 3, it will be noted that handle 42 is so disposed relative to the clutch parts that when it is disposed in vertical position, as in Fig. 2, the clutch parts occupy a neutral or non-operating position, with pin 33 in intermediate vertical position, as shown.

It will be apparent that rotation of the handle toward the left, as in Fig. 3, will result in upward movement of shaft 20 to cause rotation of the wringer rolls, for example, in reverse direction relative to the side viewed in Fig. 1, whereas rotation of handle 42 in the opposite direction will result in downward movement of shaft 20 to engage gear 18 and thereby rotate the wringer rolls in the opposite direction.

Considering that an operator using the wringer is positioned on the left hand side, as in Figs. 2 or 3, it is clear that materials would be fed to the wringer from this side, and therefore the heaviest duty of the rollers would be performed during rotation thereof in the direction provided through engagement of gear 18 with the power means.

Since gear 18 is in mesh with the gears of both rollers, ample driving power is transmitted. In this case, reverse rotation of the rollers would be required only for disengaging tangled materials, etc. and therefore reverse rotation need have relatively less driving power such as is provided through the single roller connection of gear 19.

The utility of the special gear form and arrangement herein shown and described will be apparent when it is explained that under conditions of practical use wringer rolls, and therefore wringer roll gears do not remain in fixed position relative to each other. Due to varying thickness of materials, passed between the rolls, the rolls and gears are forced apart varying distances.

With the present arrangement, wringer roll gear 16 is free to move vertically, to any workable extent without alteration of the gear driving relation between gear 16 and spur gear 18.

What I claim is:

1. A wringer drive mechanism comprising dual wringer roll gears, dual vertically disposed spur gears in constant mesh therewith, a slidable drive shaft mounted in the spur gears having secured thereto clutching means adapted to engage complemental clutching means of the spur gears, manual means for sliding the drive shaft within the spur gears to selectively engage the clutching means thereof with the spur gears to drive the wringer roll gears in a selective manner.

2. A wringer drive mechanism comprising dual wringer roll gears, a vertical drive shaft disposed adjacent thereto, dual spur gears mounted upon said shaft, one of the spur gears being constantly in mesh with both of the wringer roll gears, the other being constantly in mesh with one of the wringer roll gears, clutching means associated with each of the spur gears and drive shaft to selectively engage one of the gears with the shaft to rotate the wringer rolls in predetermined direction.

3. In a wringer roll driving mechanism, the combination of dual wringer roll gears, dual vertically disposed spur gears in constant mesh therewith, a drive shaft rotatably and slidably mounted within said spur gears, co-operative clutching means associated with said spur gears and driving shaft, said clutching means adapted to be made operative by means of vertical movement of said shaft and manual means for imparting vertical movement to said shaft.

4. A wringer roll drive mechanism including separated upper and lower wringer roll gears, a vertically disposed spur gear meshing with both of the roll gears in such a manner as to form separate driving means therebetween, the roll gears movable relative to each other in the plane of their rotation and longitudinally of the spur gear without alteration of the driving relationship between the spur and roll gears, and means for driving the spur gear to impart rotation to the roll gears.

NICHOLAS L. ETTEN.